United States Patent [19]
Yoshikawa

[11] Patent Number: 5,845,613
[45] Date of Patent: Dec. 8, 1998

[54] VARIABLE VALVE TIMING ARRANGEMENT FOR INTERNAL COMBUSTION ENGINE

[75] Inventor: Masaaki Yoshikawa, Iwata, Japan

[73] Assignee: Yamaha Hatsudoki Kabushiki Kaisha, Iwata, Japan

[21] Appl. No.: 831,836

[22] Filed: Apr. 2, 1997

Related U.S. Application Data

[63] Continuation of Ser. No. 409,894, Mar. 23, 1995, abandoned, which is a continuation of Ser. No. 138,034, Oct. 15, 1993, abandoned.

[30] Foreign Application Priority Data

Oct. 16, 1992 [JP] Japan ..................................... 4-303235

[51] Int. Cl.⁶ ................ F01L 13/00; F01L 1/34
[52] U.S. Cl. ....................... 123/90.15; 123/435
[58] Field of Search ................ 123/90.15, 90.16, 123/90.17, 425, 435

[56] References Cited

U.S. PATENT DOCUMENTS

| | | | |
|---|---|---|---|
| 4,788,946 | 12/1988 | Inoue et al. ................ | 123/90.16 |
| 4,958,606 | 9/1990 | Hitomi et al. ................ | 123/90.15 |
| 4,960,094 | 10/1990 | Koike et al. ................ | 123/90.16 |
| 4,960,095 | 10/1990 | Koike et al. ................ | 123/90.16 |
| 4,969,352 | 11/1990 | Sellnau ................ | 73/115 |
| 5,109,813 | 5/1992 | Trzmiel et al. ................ | 123/90.17 |
| 5,111,780 | 5/1992 | Hannibal ................ | 123/90.17 |
| 5,115,782 | 5/1992 | Klinke et al. ................ | 123/90.11 |
| 5,140,955 | 8/1992 | Sono et al. ................ | 123/90.15 |
| 5,255,637 | 10/1993 | Schechter ................ | 123/90.15 |

*Primary Examiner*—Weilun Lo
*Attorney, Agent, or Firm*—Knobbe, Martens, OLson & Bear LLP

[57] ABSTRACT

Several embodiments of valve timing control for internal combustion engines so as to improve the engine performance in response to sensed characteristics. In addition, the valve timing is also changed either to avoid knocking in incipient knocking conditions or to stop knocking once it has occurred. Both normally aspirated and supercharged versions are described.

26 Claims, 8 Drawing Sheets

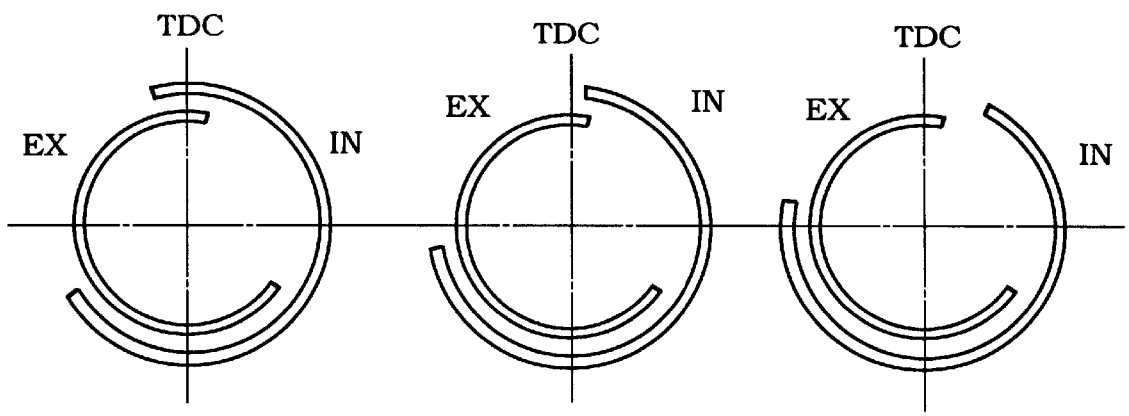
Figure 3  Figure 4  Figure 5

VARIABLE VALVE TIMING ARRANGEMENT FOR INTERNAL COMBUSTION ENGINE

This application is a continuation of U.S. patent application Ser. No. 08/409,894, filed Mar. 23, 1995, which was a continuation of U.S. patent application Ser. No. 08/138,034, filed Oct. 15, 1993, both abandoned.

BACKGROUND OF THE INVENTION

This invention relates to a variable valve timing arrangement for internal combustion engines and more particularly to an improved arrangement for reducing knocking in an internal combustion engine.

It is well known that many factors in the design of an internal combustion engine represent a compromise. That is, many features of the design of an engine can affect its performance and some features tend to improve low speed, low load performance whereas other features tend to improve high speed, high load performance. Normally it has been the practice, for engines that operate under widely varying load and speed requirements such as automotive engines, to adapted parameters that represent a compromise between the two extremes. However, it has been proposed to provide some arrangement for adjusting these parameters during the engine running so as to obtain more optimum performance over the varying speed and load ranges.

The timing of the opening of the intake and exhaust ports is a good example where compromises had been made. Regardless of whether the engine operates on a two stroke or a four stroke principal, an extended overlap between the opening of the exhaust port and the closing of the intake port can significantly affect the engine performance. If low overlaps are employed, the engine will run better at low speeds but will not develop maximum power. On the other hand, if large overlaps are employed then the engine will develop maximum power, but will have bad or poor low speed performance. Thus, it has been the practice to compromise the design toward the high or load speed end depending upon the particular application for the engine.

There have, however, been proposed various arrangements for both two and four cycle engines so as to vary the timing of the opening and closing of either or both of the intake and exhaust ports. Such variable timing mechanisms are extremely effective in permitting the engine to operate not only efficiently and smoothly at low speeds, but also to obtain good high speed performance. For the most part, the arrangements previously proposed for this purpose have been limited specifically toward improving engine performance in the form of power output and smoothness.

It is, therefore, a principal object to this invention to provide an improved timing system and varying arrangement for an internal combustion engine wherein, in addition to the advantages of the prior art type of constructions, knocking control for the engine can also be achieved.

It is a further object to this invention to provide an improved apparatus and method for controlling the timing of the intake and exhaust port opening and closings relative to each other so as to reduce knocking as well as improve performance throughout the entire engine speed and load ranges.

SUMMARY OF THE INVENTION

This invention is adapted to be embodied in a method and apparatus for an internal combustion engine that comprises a combustion chamber defined by a cylinder defining a cylinder bore in which a piston reciprocates. A cylinder head closes the cylinder bore and intake port means supply a charge to the combustion chamber and exhaust port means discharge the charge from the chamber. Intake port control means control the timing of opening and closing of the intake port means in response to the position of the piston in the cylinder bore and exhaust port control means control the timing of the opening and closing of the exhaust port means in relation to the position of the piston in the cylinder bore.

In accordance with an apparatus for practicing for the invention, means are provided for sensing a condition of the engine which condition may result in the occurrence of knocking and varying the timing of at least one of the control means in response to this signal to preclude knocking.

A method embodying the invention includes the steps of sensing the condition of the engine to determine when knocking may occur and varying the timing of at least one of the control means to preclude knocking.

BRIEF DESCRIPTION OF THE DRAWINGS

FIGS. 3, 4 and 5 are timing diagrams showing the respective timing of the opening and closing of the intake and exhaust valves under maximum overlap, partial overlap and no overlap conditions, respectively.

DETAILED DESCRIPTION OF THE PREFERRED EMBODIMENTS OF THE INVENTION

Figure 1:
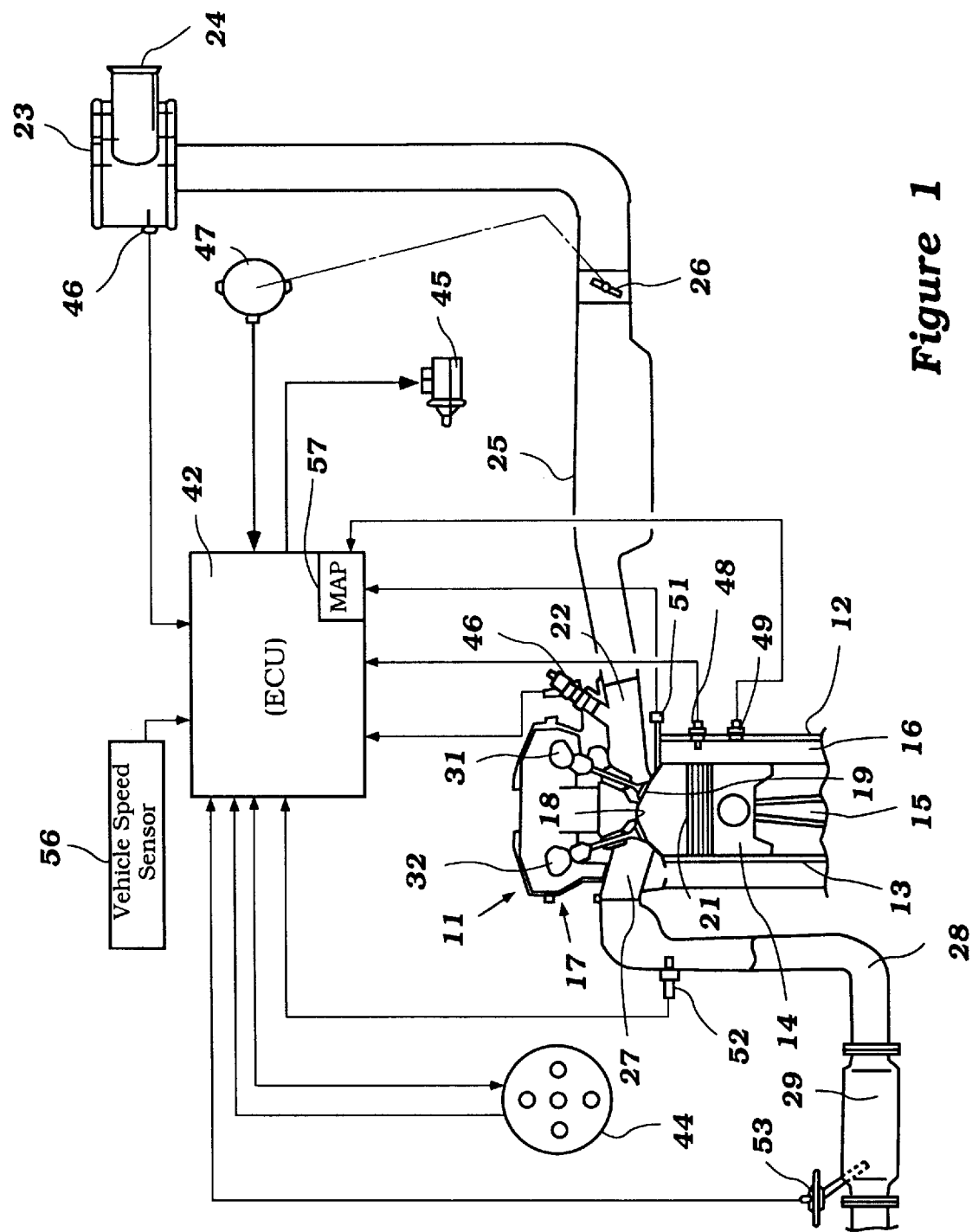
FIG. 1 is a partially schematic, cross sectional view taken through a portion of an internal combustion engine constructed and operated in accordance with a first embodiment of the invention.
Figure 2:
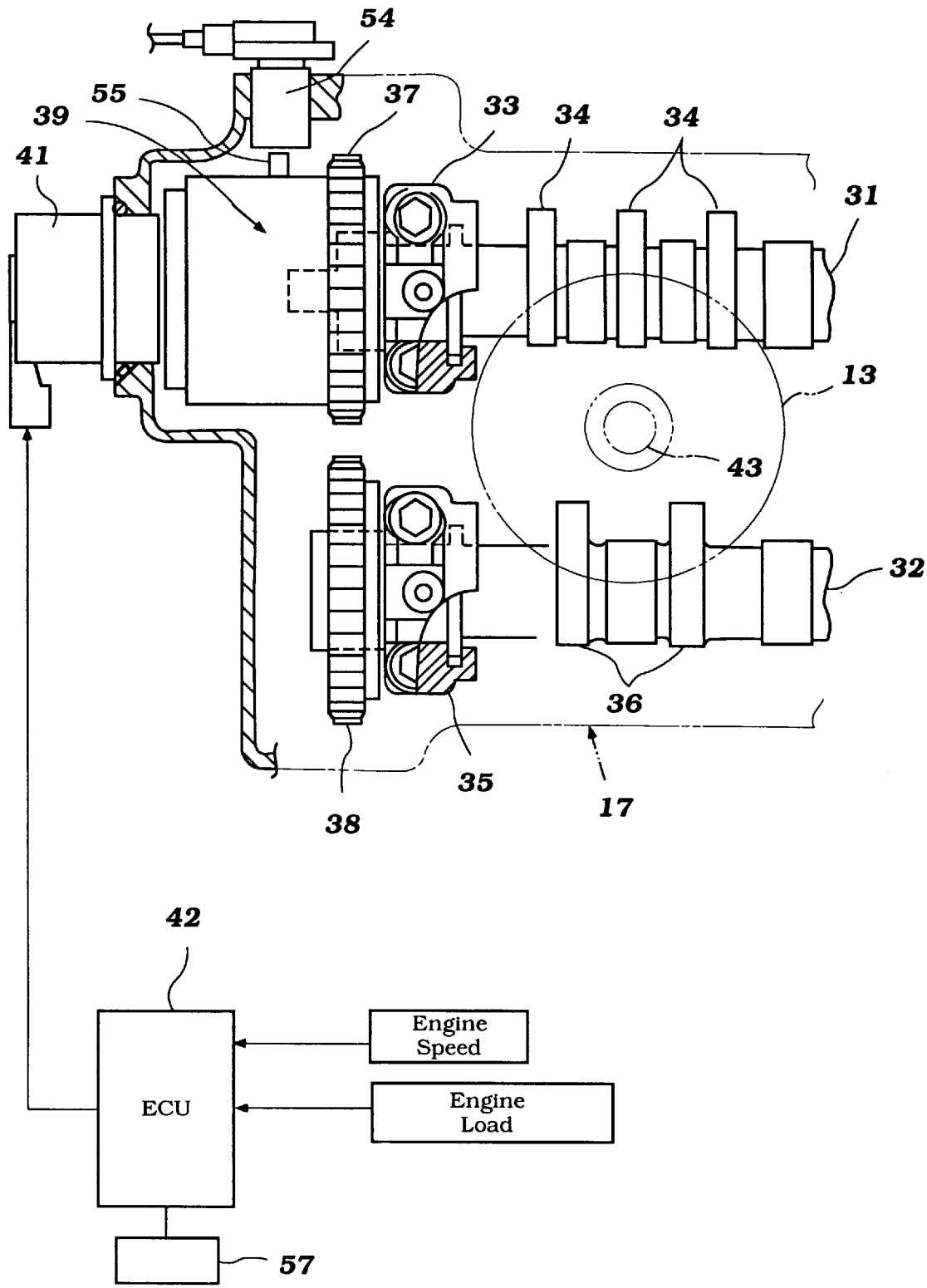
FIG. 2 is an enlarged top plan view, with portions broken away, showing the valve timing mechanism of this embodiment.

Referring now in detail initially to the embodiment of FIGS. 1 through 6 and initially to FIGS. 1 and 2, an internal combustion engine constructed and operated in accordance with an embodiment of the invention is identified generally by the reference numeral 11. The engine 11 is shown only partially and by way of a cross section through a single cylinder in FIG. 1. The invention deals primarily with the camshaft and timing arrangement for the engine 11 and, except for this portion of the construction, the engine 11 may be considered to be of any conventional type. Also, the engine 11 is depicted through only a single cylinder because it is believed to be readily apparent to those skilled in the art how the invention may be practiced with multiple cylinder engines. Also, the described embodiments relate to four cycle engines, but it will be apparent to those skilled in the art how the invention can also be practiced in conjunction with two cycle engines. The invention, however, has particular utility with four cycle engines because they are more easily adaptable to variable timing events, as will become apparent.

The engine 11 is comprised of a cylinder block 12 having one or more cylinder bores formed by liners 13. Pistons 14 are slideably supported in the cylinder bores and are connected by means of connecting rods 15 to drive a crankshaft (not shown in this embodiment) in a well known manner. In the illustrated embodiments, the engine 11 is water cooled and the cylinder block 12 is provided with a cooling jacket 16 through which water is circulated in a known manner. A cylinder head assembly 17 is affixed to the cylinder block 12 and is formed with a recess 18 which, in cooperation with the head of the piston 14 and the cylinder bore 13, forms the combustion chamber of the engine 11.

Also mounted within the cylinder head assembly 17 is one or more intake valves 19 for each cylinder and one or more exhaust valves 21. The intake valves 19 control the flow of an intake air charge into the combustion chambers from intake passages 22 formed in one side of the cylinder head assembly 17. An intake charge is delivered to the intake passages 22 by an induction system comprised of an air cleaner silencer assembly 23 which draws atmospheric air through an air inlet 24 and delivers it to an intake manifold 25 in which a throttle valve 26 is provided for controlling the engine speed in a well known manner.

Exhaust passages 27 are formed in the side of the cylinder head 17 opposite the intake passages 22 and deliver the burnt charge from the combustion chambers past the exhaust valves 21 into an exhaust system, indicated generally by the reference numeral 28 and in which a muffler or catalytic convertor or both 29 is positioned so as to discharge the exhaust gases to the atmosphere. The engine 11 as thus far described may be considered to be conventional, as has been previously noted.

The intake and exhaust valves 19 and 21 are operated by respective intake and exhaust camshafts 31 and 32 which are rotatably journalled in the cylinder head assembly 17 and which are driven in a manner as may be best understood by reference to FIG. 2.

As may be seen in FIG. 2, the intake camshaft 31 is journalled in the cylinder head assembly 17 by means of a plurality of spaced apart bearings 33, only one of which appears in this figure. The intake camshaft 31 is provided with three cam lobes 34 which operate three intake valves 19 associated with each cylinder 13. Although the invention is described in conjunction with an engine having three intake valves per cylinder, as has been previously noted, any number of valves per cylinder may be employed.

In a similar manner, the exhaust camshaft 32 is rotatably journalled in the cylinder head assembly 17 by means of a plurality of spaced bearings 35, only one of which appears in the drawings. Like the intake camshaft 31, the exhaust camshaft 32 has lobes 36 that operate with the exhaust valves 21 for effecting their operation. In the illustrated embodiment, there are two exhaust valves per cylinder and hence there are two exhaust cam lobes 36 for each cylinder.

Intake and exhaust sprockets 37 and 38 are associated with the intake and exhaust camshafts 31 and 32 for driving them. A suitable chain (not shown) is entrained around the sprockets 37 and 38 and a sprocket formed on the crankshaft of the engine so that the sprockets 37 and 38 will be driven at one half of crankshaft speed. The exhaust camshaft sprocket 38 is directly affixed to the exhaust camshaft 31 while the intake sprocket 37 is connected to the intake camshaft 31 by a variable timing mechanism, indicated generally by the reference numeral 39. The variable timing mechanism 39 is of any known type and is effective so as to change the phase angle between the sprocket 37 and the intake camshaft 31 for varying the timing of the opening and closing of the intake valves, as will be described. This variable timing mechanism 39 is controlled by a control, indicated generally by the reference numeral 41 and which receives a control signal from the ECU, indicated schematically at 42 and shown in both FIGS. 1 and 2.

FIGS. 3 through 5 are timing diagrams which show the opening and closing of the intake and exhaust valves under three different conditions. FIG. 3 shows the normal condition when operating at high speed, high output and wherein the timing of the intake valve opening is chosen so as to open 10° before top dead center and close approximately 60° after bottom dead center. The exhaust timing, is fixed and the exhaust valve opens approximately 60° before bottom dead center and closes approximately 5° to 10° after top dead center. As a result, there will be overlap between the closing of the exhaust valve and the opening of the intake valve.

FIG. 4 shows a condition when the intake valve opening is retarded to a partial extent so that the intake valve now will open at approximately 5° after top dead center and close at approximately 75° after bottom dead center. The exhaust timing is not varied and it will be seen that there is a little or no overlap between the closing of the exhaust valve and the opening of the intake valve under this condition.

FIG. 5 shows the maximum intake valve retardation and also no overlap between the closing of the exhaust valve and the opening of the intake valve for good low speed performance. In this case, intake valve opening is retarded to about 15° after top dead center. The control strategy will be described later as to the control for the timing of the retardation of the opening of intake valves by the intake camshaft 31.

The engine 11 also includes a spark plug, shown at 43 in FIG. 2 which is positioned in the cylinder head 17 centrally of the recess 18. The spark plug 43 is fired by means of an ignition system that includes a distributor 44 and one or more ignition coils 45 that supply a spark to the spark plugs 43 under the control of the ECU 42 under any suitable strategy.

In addition, the engine 11 is provided with a manifold injection system including manifold fuel injectors 46 which are also controlled by the ECU 42 and which spray into the cylinder head intake passages 22 in an amount and at a timing controlled by any suitable strategy.

A number of sensors are employed for the control of the engine 11 and as will be readily apparent to those skilled in the art, the number or types of sensors employed can vary depending upon the particular desired control strategy. As exemplary sensors shown in FIGS. 1 and 2, there is an intake air temperature sensor 46 that is mounted in the air inlet device 23 and which transmits its temperature signal to the ECU 42. In addition, there is a throttle position sensor 47 that is connected to the throttle valve 29 and which also outputs a signal to the ECU 42. Throttle valve position is indicative of engine speed and/or load and also intake air amount. Of course, intake air amount sensors of a known type may also be employed.

The engine cooling jacket 16 is provided with an engine coolant temperature sensor 48 which outputs its signal of engine operating temperature also to the ECU 42. A knock sensor 49 may be mounted in the cylinder block 12 or cylinder head 17 and also outputs a signal to the ECU 42 which is indicative of knocking conditions in the engine. A combustion chamber pressure sensor 51 is mounted in the cylinder head 17 and senses the actual pressure in the combustion chamber and outputs a signal to the ECU 42 indicative of this condition.

There is also provided an oxygen sensor 52 which is mounted in the exhaust system 28 and outputs a signal to the ECU 42 which will indicate the richness of the fuel/air mixture through the presence of oxygen in the exhaust gases. An exhaust temperature probe 53 may extend into the catalytic convertor 29 and also provide an exhaust temperature signal to the ECU 42. In addition, a sensor 54 may be mounted in the cylinder head 17 (FIG. 2) and cooperate with a marker 55 on the VVT unit 39 so as to provide an indication of camshaft position and/or crankshaft position as well as speed.

The engine speed and engine load signals are represented diagrammatically in FIG. 2 as their outputs to the ECU 42 are indicated. There may also be provided a vehicle speed sensor, indicated schematically at 56 in FIG. 1 which outputs a signal indicative of vehicle speed to the ECU 42. As noted, the sensors as thus far described may be considered to be typical of those type of sensors which are employed for engine control.

Figure 6:
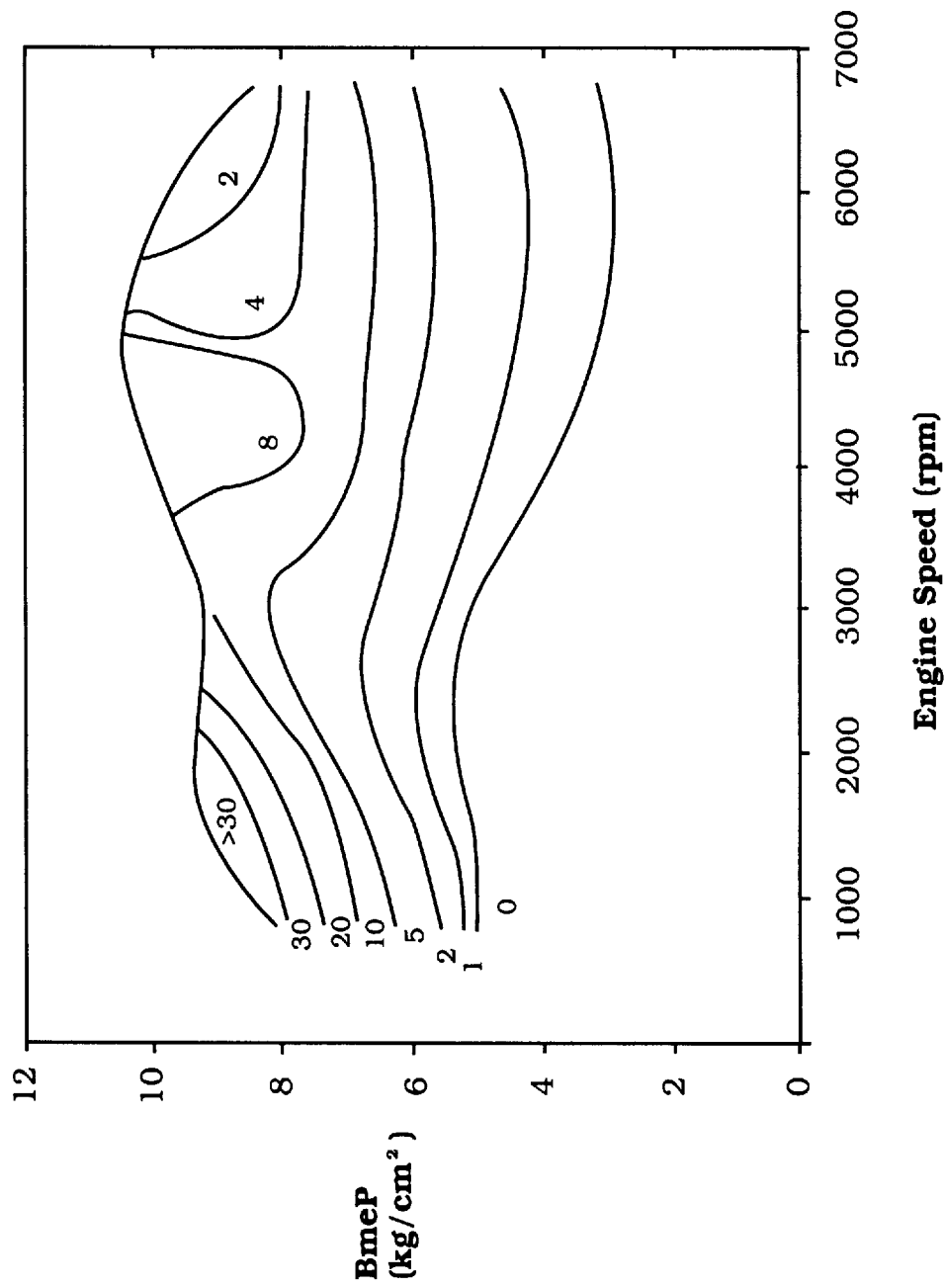
FIG. 6 is a map showing the timing retardation of the intake valve relative to engine speed and BMEP in accordance with the control routine of this embodiment.
Figure 7:
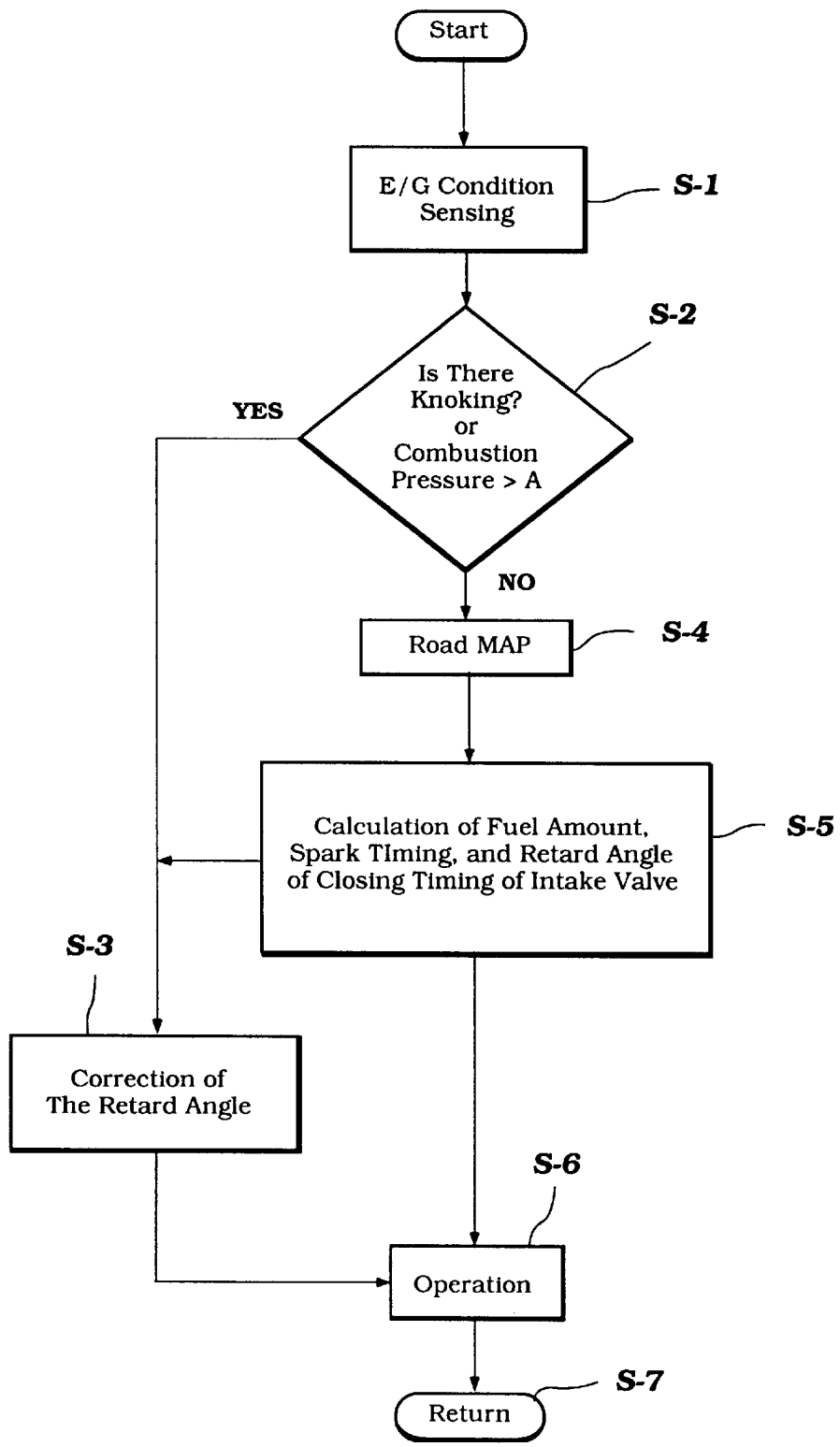
FIG. 7 is a block diagram showing how the timing control is effected in accordance with this embodiment.

The ECU 42 is provided with a map 57 in which a plurality of intake valve timing maps are contained as shown in FIG. 6 which are experimentally determined so as to obtain the desired performance. In FIG. 6, the maps are related to engine speed and engine load or output in the term of BMEP. The families of curves will depend upon the various noted parameters in accordance with any control strategy such as engine speed, BMEP, atmospheric pressure, intake air temperature, engine water temperature, etc. The intake valve timing control in conjunction with these set conditions of the engine are well known and those skilled in the art can select any suitable system. However, in accordance with the invention, an arrangement is also provided for decreasing the retarding of the opening of the intake valve and, accordingly, decreasing the amount of intake and exhaust overlap so as to reduce the likelihood of knocking so as to prevent knocking under certain running conditions, particularly high load, high speed conditions. A control routine which may be employed in conjunction with such an arrangement is shown in FIG. 7 and will now be described by reference to that figure.

Once the program starts, it is moves to the step S-1 so as to sense the engine and ambient running conditions by reading the outputs of the various sensors. In addition, the program then moves to the step S-2 so as to determine if there is knocking either by sensing an output from the knock sensor 49 or if there is a condition when knocking is likely to occur as by sensing the combustion chamber pressure from the sensor 51. It is determined that knocking is likely if combustion chamber pressure is greater than a predetermined pressure A. If there is knocking or the likelihood of knocking, the program moves to the step S3 so as to provide a correction in the intake valve opening by selecting an appropriate retardation angle from the pre-established information fed into the ECU 42 for the other sensed conditions.

If a knocking condition is not likely to occur or if knocking is not occurring, the program moves from the step S-2 to the step S-4 so as to read from the map of FIG. 6 (map 57) the optimum intake valve timing as well as from other maps the amount and timing of fuel for the fuel injector 46 and the timing for firing of the spark plugs 43 at the step S-5. This calculation will be corrected if knocking has been determined or if the likelihood of knocking is present at the step S-3. The program then moves to the step S-6 so as to actuate the control 41 for changing the variable valve timing device 39 and appropriately adjusting the timing of the opening of the intake valves by the intake camshaft 31. The program then repeats at the step S-7.

Figure 8:
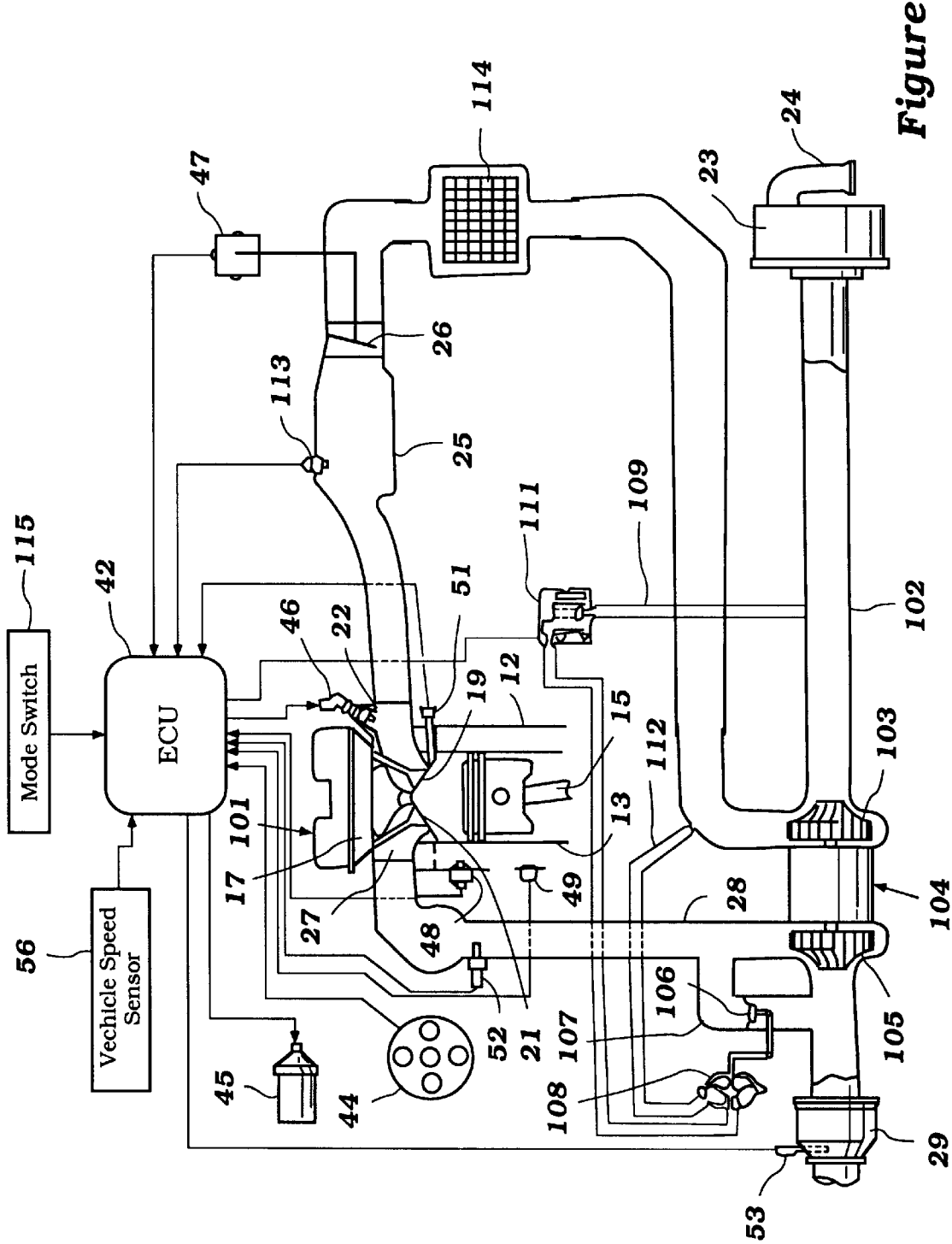
FIG. 8 is a partially schematic, partial cross sectional view, in part similar to FIG. 1, and shows another embodiment of the invention.
Figure 9:
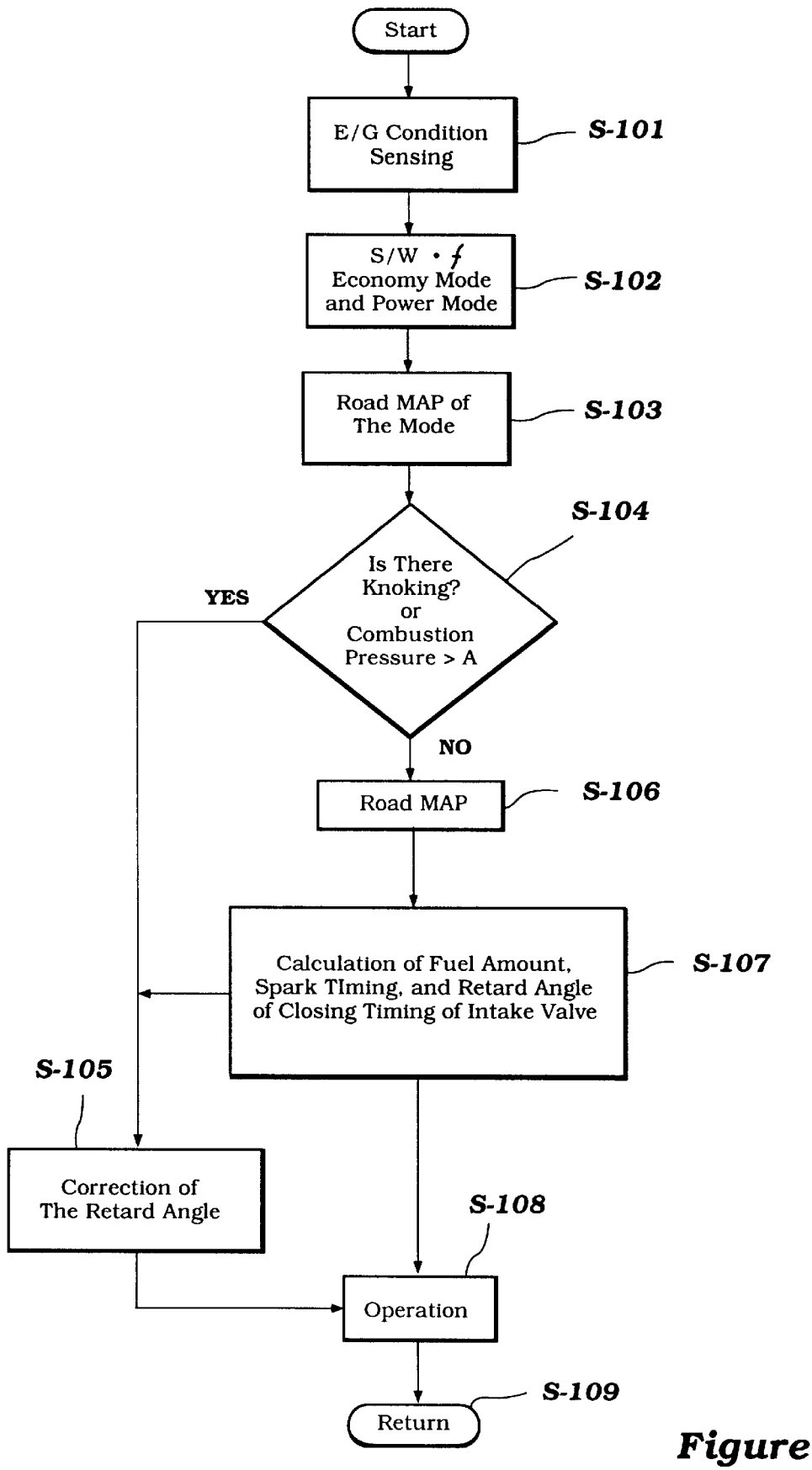
FIG. 9 is a diagrammatic view showing the control routine of this embodiment.

In the embodiment of the invention as thus far described, the engine 11 has been a normally aspirated engine. The invention also is capable of use in conjunction with supercharged and/or turbo charged engines and such an embodiment is shown in FIGS. 8 and 9 wherein the engine is identified generally by the reference numeral 101. Many of the basic components of the engine 101 and its controls are the same as those previously described and where that is the case, those components have been identified by the same reference numerals and will be described again only in detail insofar as is necessary to understand the construction and operation of this embodiment.

Referring primarily to FIG. 8, in this embodiment the air inlet device 23 delivers atmospheric air through an air delivery conduit 102 to the compressor stage 103 of a turbo charger, indicated generally by the reference numeral 104. The turbo charger 104 has a turbine stage 105 that receives the exhaust gases from the engine through the exhaust manifold 28 and discharges them to the catalytic convertor 29. A boost pressure control valve 106 is positioned in a bypass passage 107 that extends around the turbine 105 of the turbo charger 104 so as to limit maximum boost pressure. This is accomplished by means of a servo 108 that receives an atmospheric pressure signal from a conduit 109 in which a control valve 111 is positioned and which communicates with the air delivery conduit 102. In addition, a boost pressure passage 112 also extends to the servo 108. If the control 111 is in an opened position, boost pressure will be bleed off back to the induction system and the control valve 106 will be closed and full boost will be obtained. However, if boost pressure becomes too high and the valve 111 is closed, then the pressure in the control 108 will cause the valve 106 to open and bypass the turbine stage 105 and limit the boost, as is well known in this art.

The boost pressure is also sensed by a pressure sensor 113 positioned downstream of the throttle valve 26 and outputs the signal to the ECU 42.

An innercooler 114 of any known type is interposed in the system connecting the compressor stage 103 of the turbo charger 104 to the intake manifold 25. The innercooler 114 may be of any known type.

In accordance with a feature of the invention, the amount of boost pressure may also be varied by a mode switch, indicated generally by the reference numeral 115 and which is coupled to the ECU 42 to operate the valve 111 and limit the boost under some conditions. The mode switch 115 may be operated by the operator so as to provide either an economy mode where the boost pressure is limited and a power mode wherein the boost pressure is not limited, as will now be described by particular reference to the operational diagram of FIG. 9.

As with the previously described embodiment, this routine is only one of many which may be employed and it is also to be understood that the various sensed parameters may vary depending upon the desired control routine. The control routine of FIG. 9 is generally the same as that of the previously described embodiment in FIG. 7, but this routine will be described in its entirety.

When the program starts it moves to the step S101 so as to read all of the sensors and sense the engine condition. The program then moves to the step S102 so as to read the condition of the mode switch 115 so as to determine if the system is operating in the economy mode or the power mode. The program then moves to the step S103 so as to read the maps of the respective modes so as to determine if the system requires correction because of knocking or combustion chamber pressure similar to the step S2 of the previous embodiment. It should be noted that the knocking condition and likelihood of knocking will depending upon whether operating in the power or economy modes.

The program then moves to the step S104 to determine if the knocking sensor 49 indicates a knocking condition or if the pressure sensor 51 has a combustion pressure which is higher than the pressure A which is indicative of an incipient knocking condition. If either condition is present, the program moves to the step S105 to make a correction in the intake valve opening so as to change its opening point appropriately to avoid the knocking.

After the step S104, the program also moves to the step S106 to read the appropriate maps and then to the step S107 to calculate the various engine control features such as the fuel injection amount, spark timing, and normal intake valve timing. The program then moves to the step S108 so as to effect the operation of all of the controls including that of the variable valve timing so as to set them as aforedescribed and then the program returns at the step S109.

Figure 10:
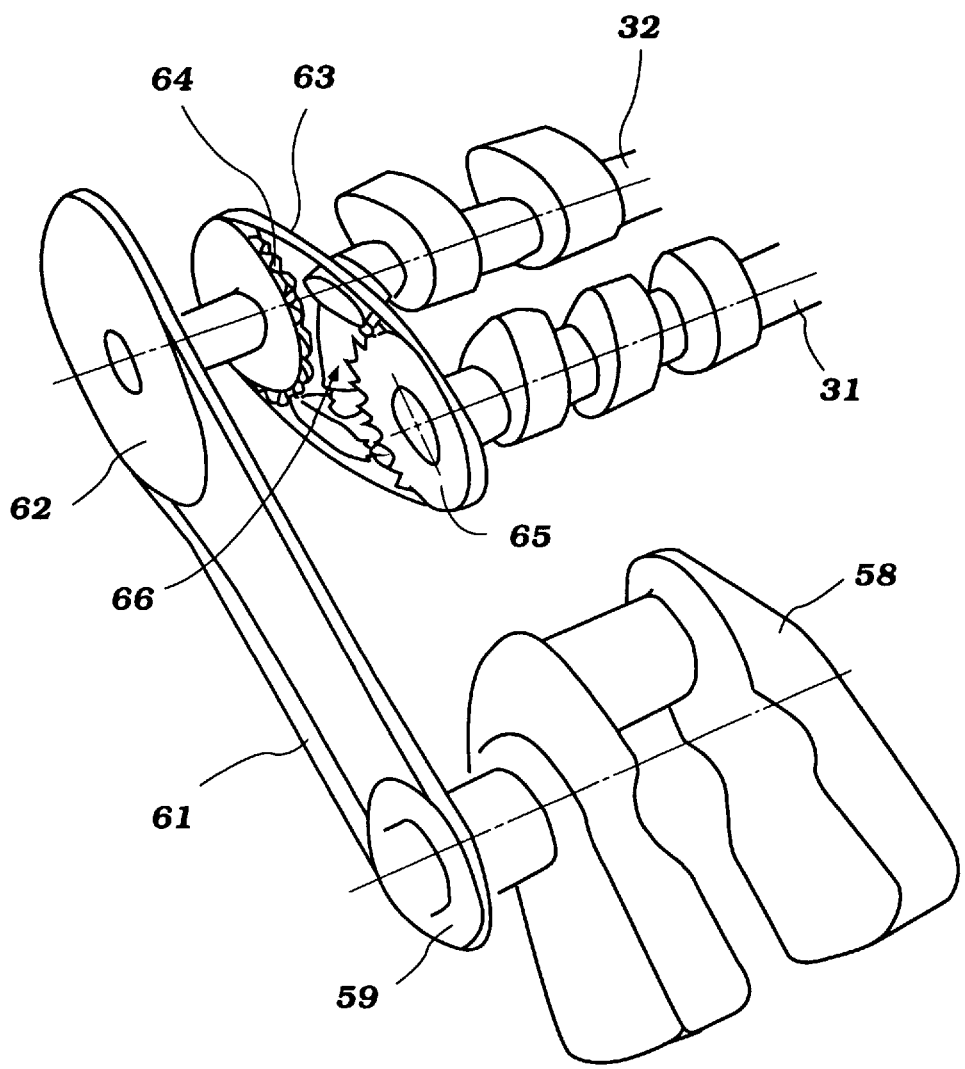
FIG. 10 is a perspective view of a camshaft drive constructed in accordance with yet another embodiment of the invention.

Embodiments of the invention as thus far described only the timing of the intake cam shaft 31 has been varied whereas the timing of the exhaust cam shaft has been held fixed. Of course, the invention may also be employed in conjunction with engines where both the timing of the intake and the exhaust cam shafts 31 and 32 are varied and FIG. 10 shows an arrangement wherein this can be accomplished.

In these Figures, the engine crank shaft is also illustrated and it is identified by the reference numeral 58 and has the sprocket 59 for driving either a chain or a toothed belt 61. In this embodiment, the exhaust cam shaft 31 is directly driven from the crank shaft 58 by means of a toothed sprocket 62 that is affixed for rotation with the exhaust cam shaft 32. The intake cam shaft 31 is, on the other hand, driven by a second timing chain 63 that is trained around a sprocket 64 affixed to the exhaust cam shaft 32 and a sprocket 65 affixed to the intake cam shaft 31. A combined tensioner timing adjusting device 66 is interposed between the sprocket 64 and 65 and is adapted to maintain not only constant tension in the chain 63, but also so as to shift the phase angle between the sprocket 64 and 65 so as to adjust the timing of the intake and exhaust cam shafts 31 and 32 relative to the crank shaft 58 as well known with this type of tensioner. The control strategy may be of any of the types previously described.

It should be readily apparent from the foregoing description that the described embodiments of the invention are very effective in providing optimum engine running characteristics under all conditions and also is capable of adjusting the valve timing so as to avoid knocking or stop knocking once it occurs. Of course, the foregoing description is only that of preferred embodiments of the invention and various changes in modification may be made without departing from the spirit and scope of the invention, as defined by the appended claims.

I claim:

1. An internal combustion engine comprising a combustion chamber defined by a cylinder defining a cylinder bore, a piston reciprocating in said cylinder bore, and a cylinder head closing said cylinder bore, intake port means for supplying a charge to said combustion chamber, an intake valve for controlling the timing of opening and closing of said intake port means in timed relation to the position of said piston in said cylinder bore and for a fixed duration, exhaust port means for discharging a burnt charge from said combustion chamber, an exhaust valve for controlling the timing of opening and closing of said exhaust port means in timed relation to the position of said piston in said cylinder bore and for a fixed duration, means for sensing a condition of said engine indicative of a condition when knocking may occur, and means for varying the timing of both the opening and closing of at least one of said valves in response to the sensed signal in the same direction and in the same amount so as not to alter the fixed duration of said one valve to preclude knocking by controlling the amount of intake air charge transferred back into said intake port means when said piston is moving toward top dead center.

2. An internal combustion engine as set forth in claim 1 wherein the means for sensing a condition of the engine comprises a knock sensor for sensing actual knocking conditions.

3. An internal combustion engine as set forth in claim 1 wherein the means for sensing a condition of the engine comprises a combustion chamber pressure sensor for sensing when combustion pressure is such that knocking may occur.

4. An internal combustion engine as set forth in claim 3 wherein the means for sensing a condition of the engine further includes a knock sensor for sensing an actual knocking condition.

5. An internal combustion engine as set forth in claim 1 wherein the valve timing varied to prevent knocking comprises the intake valve.

6. An internal combustion engine as set forth in claim 5 wherein the intake valve is adjusted so as to reduce the likelihood of knocking by retarding the opening of the intake valve and the closing of the intake valve.

7. An internal combustion engine as set forth in claim 1 further including further sensing means for sensing other engine conditions and for varying the valve timing to optimize running conditions in response to all of the sensed conditions.

8. An internal combustion engine as set forth in claim 7 wherein the valve timing is further adjusted when a knocking condition is sensed by adjusting the timing from a position other than that set for the normal sensed engine conditions.

9. An internal combustion engine as set forth in claim 8 wherein the means for sensing a condition of the engine comprises a knock sensor for sensing actual knocking conditions.

10. An internal combustion engine as set forth in claim 8 wherein the means for sensing a condition of the engine comprises a combustion chamber pressure sensor for sensing when combustion pressure is such that knocking may occur.

11. An internal combustion engine as set forth in claim 10 wherein the means for sensing a condition of the engine further includes a knock sensor for sensing an actual knocking condition.

12. An internal combustion engine as set forth in claim 8 wherein the valve timing varied to prevent knocking comprises the intake valve.

13. An internal combustion engine as set forth in claim 12 wherein the intake valve is adjusted so as to reduce likelihood of knocking by changing the opening of the intake valve and the closing of the intake valve.

14. A method for operating an internal combustion engine comprising a combustion chamber defined by a cylinder defining a cylinder bore, a piston reciprocating in said cylinder bore, and a cylinder head closing said cylinder bore, intake port means for supplying a charge to said combustion chamber, an intake valve for controlling the timing of opening and closing of said intake port means in timed relation to the position of said piston in said cylinder bore and for a fixed duration, exhaust port means for discharging a burnt charge from said combustion chamber, an exhaust valve for controlling the timing of opening and closing of said piston in said cylinder bore and for a fixed duration, said method comprising the steps of sensing a condition of said engine indicative of a condition when knocking may occur, and varying the timing of both the opening and closing of at least one of said valves in the same direction and in the same amount in response to the sensed condition without changing the fixed duration to preclude knocking by controlling the amount of intake air charge transferred back into said intake port means when said piston is moving toward top dead center.

15. A method as set forth in claim 14 wherein the means for sensing a condition of the engine comprises a knock sensor for sensing actual knocking conditions.

16. A method as set forth in claim 14 wherein the means for sensing a condition of the engine comprises a combustion chamber pressure sensor for sensing when combustion pressure is such that knocking may occur.

17. A method as set forth in claim 16 wherein the means for sensing a condition of the engine further includes a knock sensor for sensing an actual knocking condition.

18. A method as set forth in claim 14 wherein the valve having the timing varied to prevent knocking comprises the intake valve.

19. A method as set forth in claim 18 wherein the intake valve is adjusted so as to reduce the likelihood of knocking by retarding the opening of the intake valve and the closing of the intake valve.

20. A method as set forth in claim 14 further including sensing other engine conditions and varying the valve timing to optimize running conditions in response to all of the sensed conditions.

21. A method as set forth in claim 20 wherein the valve timing is further adjusted when a knocking condition is sensed for adjusting the valve timing from a timing other than that set for the normal sensed engine condition.

22. A method as set forth in claim 21 wherein the sensed condition of the engine comprises sensing actual knocking conditions.

23. A method as set forth in claim 21 wherein the sensed condition of the engine comprises sensing when combustion pressure is such that knocking may occur.

24. A method as set forth in claim 23 wherein the sensed condition of the engine further includes a knock sensor for sensing an actual knocking condition.

25. A method as set forth in claim 21 wherein the valve timing changed to prevent knocking comprises the intake valve.

26. A method as set forth in claim 25 wherein the intake valve is adjusted so as to reduce likelihood of knocking by changing the opening of the intake valve and the closing of the intake valve.

* * * * *